Patented June 1, 1937

2,082,576

UNITED STATES PATENT OFFICE 2,082,576

TEXTILE ASSISTANT COMPOSITIONS

Clyde O. Henke and William H. Lockwood, Wilmington, Del., assignors to E. I. du Pont de Nemours & Company, Wilmington, Del., a corporation of Delaware No Drawing. Application June 22, 1935
Serial No. 28,018

2 Claims. (Cl. 252—1)

This invention relates to the improvement of the physical appearance and state of textile assistant compositions by replacing sodium sulfate in them with a more soluble salt which is accomplished by treating them with a solution of the salt. More particularly, the invention relates to an improved textile assistant composition containing the sodium salt of sulfated oleyl acetate and sodium chloride, said composition being essentially free of sodium sulfate.

The products of this type which have heretofore been produced, such as the sodium salt of sulfated oleyl acetate, have contained considerable quantities of sodium sulfate. When material of this type is being consumed intermittently over a period of time, the composition of that used first is different from that used after a period of time due to the separation and settling of solid matter during that period. When an assistant of such variable composition is used in processing textiles, difficulty in maintaining uniformity of treatment may be encountered resulting in products of inferior quality.

This invention has as an object an improvement in the homogeneity and appearance of textile assistant compositions of the sulfate ester type. A further object is to manufacture textile assistant compositions of the sulfate ester type which do not separate inorganic salts on standing, particularly in the cold, and are practically free from sodium sulfate. A still further object is to provide an easily conducted method whereby the sodium sulfate, which is generally contained in textile assistant compositions of the sulfate ester type may be replaced with sodium chloride or other similar salt having a comparable solubility in cold water. Other objects will appear hereinafter.

These objects are accomplished by the following invention which involves treating a textile assistant composition which contains sodium sulfate in objectionable quantities with a comparatively concentrated solution of a salt whose solubility at low temperatures is high, for example, sodium chloride. By this particular procedure, sodium sulfate with a solubility of 5 parts per 100 at 0° C. is replaced with sodium chloride with a solubility of 35 parts per 100 at 0° C. The concentration of the salt solution used is so fixed that it is less than that of a saturated solution at 0° C. or at any other arbitrarily selected temperature above which it is desired to have no separation of inorganic salts but in such concentration as to avoid excessive loss by solubility.

The following example shows in more detail the manner in which this invention may be carried out although the invention is not limited by this particular example.

Example

The sodium salt of sulfated oleyl acetate has heretofore been sold as a brownish colored liquid containing crystals of sodium sulfate. It is made by acetylating technical grade oleyl alcohol, sulfating the oleyl acetate thus obtained, followed by neutralization of the sulfated oleyl acetate. The commercial product thus obtained is not pure since it is made from technically available fatty alcohols. This product on acid hydrolysis shows a total fat content of about 45% by weight. To 650 parts of the commercial product are added 1000 parts of hot water and 300 parts of common salt (sodium chloride). The mixture is heated to 80–90° C. while stirring. It is then allowed to stand whereby an oily layer separates at the top. This oily layer is separated by decantation and water added to it to give a total weight of 650 parts, after which, a few parts of diatomaceous earth are added and the mixture is filtered. The product is a clear brownish colored liquid which remains clear indefinitely and shows no separation of inorganic salts even in the cold.

We do not limit ourselves to sodium chloride as the salt for replacing sodium sulfate. Since the advantage of the process lies in the fact that the salt used in the brine is much more soluble in the cold than sodium sulfate, any inorganic salt whose solubility at low temperatures is relatively large and which will not cause separation of the sulfate ester in solid form, such as ammonium chloride, potassium chloride, sodium nitrate and the like, may be used.

Our improved textile assistant compositions of the sulfate ester type derived from alcohols containing eight to twenty carbon atoms are very soluble in water and give clear, oily solutions even in high concentrations. These textile assistant compositions are practically free from sodium sulfate and do not separate inorganic salts on standing, particularly in the cold. The physical appearance of the product is thus greatly improved. The improved product not only has a better appearance but also remains constant in composition. Thus, no sediment or crystals settle out on standing which would cause a corresponding change in the composition of the mother liquor.

As many apparently widely different embodiments of this invention may be made without widely departing from the spirit and scope thereof, it is to be understood that the invention is not limited to the specific embodiments thereof except as defined in the appended claims.

We claim:

1. Improved textile assistant compositions which are essentially free of sodium sulfate and which contain water, an alkali metal salt of sulfated oleyl acetate, and an inorganic salt whose solubility at low temperatures is relatively greater than that of sodium sulfate and approximately equal to or greater than that of sodium chloride.

2. Improved textile assistant compositions which are essentially free of sodium sulfate and which contain the sodium salt of sulfated oleyl acetate and sodium chloride.

CLYDE O. HENKE.
WILLIAM H. LOCKWOOD.